US008706106B2

(12) United States Patent  
Baeder

(10) Patent No.: US 8,706,106 B2
(45) Date of Patent: Apr. 22, 2014

(54) METHOD FOR TESTING THE ALLOCATION OF A TRANSMISSION FREQUENCY, TESTER AND BASE STATION

(75) Inventor: Uwe Baeder, Ottobrunn (DE)

(73) Assignee: Rohde & Schwarz GmbH & Co. KG., Munich (DE)

(*) Notice: Subject to any disclaimer, the term of this patent is extended or adjusted under 35 U.S.C. 154(b) by 576 days.

(21) Appl. No.: 12/669,206

(22) PCT Filed: Aug. 8, 2008

(86) PCT No.: PCT/EP2008/006568
§ 371 (c)(1),
(2), (4) Date: Jan. 15, 2010

(87) PCT Pub. No.: WO2009/024270
PCT Pub. Date: Feb. 26, 2009

(65) Prior Publication Data
US 2010/0210260 A1    Aug. 19, 2010

(30) Foreign Application Priority Data
Aug. 20, 2007  (DE) .................. 10 2007 039 174

(51) Int. Cl.
H04W 24/00 (2009.01)
H04B 17/00 (2006.01)
H04W 4/00 (2009.01)
H04L 12/26 (2006.01)

(52) U.S. Cl.
USPC .............. 455/424; 455/67.11; 455/67.14; 370/341; 370/329; 370/242

(58) Field of Classification Search
USPC ........................................... 455/424
See application file for complete search history.

(56) References Cited

U.S. PATENT DOCUMENTS

| 6,347,222 B1* | 2/2002 | Niemela | 455/339 |
| 2003/0179730 A1* | 9/2003 | Lee et al. | 370/329 |
| 2003/0181220 A1* | 9/2003 | Lee et al. | 455/561 |
| 2004/0203466 A1* | 10/2004 | Kiukkonen et al. | 455/67.14 |
| 2006/0120395 A1 | 6/2006 | Xing et al. | |
| 2006/0217073 A1 | 9/2006 | Saitou et al. | |
| 2006/0250972 A1* | 11/2006 | Seebacher et al. | 370/242 |
| 2007/0026809 A1* | 2/2007 | Zhang et al. | 455/67.11 |

OTHER PUBLICATIONS

International Preliminary Report on Patentability, PCT/EP2008/006568, Mar. 11, 2010, pp. 1-9.
"IEEE Standard for Conformance to IEEE 802.16 Part 3: Radio Conformance Tests (RCT) for 10-66 GHz WirelessMAN-SC Air Interface", IEEE Standards, Jun. 25, 2004, pp. 1-85.
International Search Report, WO 2009/024270 A1, Jan. 30, 2009, pp. 29-34.

* cited by examiner

Primary Examiner — Timothy Pham
(74) Attorney, Agent, or Firm — Ditthavong Mori & Steiner, P.C.

(57) ABSTRACT

A method for testing an assignment through a base station of transmission frequency(ies) from a total number of frequencies is provided. The method includes transmission of data-signal portion(s) on assigned frequency(ies) with a signal power and a phase position, and transmission of test-signal portion(s) on non-assigned frequency(ies), where respective test-signal portion for respectively one frequency or one frequency block with several frequencies is transmitted with an individually-adjusted transmission power and phase position for each frequency or each frequency block, which differ from one another. The method includes reception of test-signal portion(s) with non-assigned frequency(ies), evaluation of signal powers and/or phase positions for test-signal portions in an individual manner for non-assigned frequencies and/or frequency blocks and evaluation of signal power and/or phase position of the assigned frequency, determination of a frequency or a frequency block to be assigned and return of an assignment signal, and comparison with an anticipated value.

19 Claims, 3 Drawing Sheets

METHOD FOR TESTING THE ALLOCATION OF A TRANSMISSION FREQUENCY, TESTER AND BASE STATION

CROSS-REFERENCE TO RELATED APPLICATION

The present application is a national phase application of PCT Application No. PCT/EP2008/006568, filed on Aug. 8, 2008, and claims priority to German Application No. 10 2007 039 174.0, filed on Aug. 20, 2007, the entire contents of which are herein incorporated by reference.

BACKGROUND OF THE INVENTION

1. Field of the Invention

The invention relates to a method for testing an assignment through a base station of one or more transmission frequencies from a total number of transmission frequencies, a test device and a corresponding base station.

2. Discussion of the Background

Modern radio-transmission methods, such as OFDMA (orthogonal frequency division multiple access) use a plurality of possible transmission frequencies. In order to achieve in each case an optimum-quality connection or respectively the optimum exploitation of the overall available bandwidth, a transmission frequency or a frequency block, which comprises several transmission frequencies, is assigned through a base station to the participating terminal device. In order to assign these transmission frequencies, the quality of the transmission for the individual transmission frequencies is analysed, for example, with regard to a phase position or a signal power. Dependent upon the result of this analysis and taking into consideration other marginal conditions, for example, already-issued frequencies or superposition of signals over possible transmission frequencies of a neighboring cell, one or more of the possible transmission frequencies is selected and assigned to the terminal device connected to the base station. This terminal device then transmits data to be communicated on the assigned transmission frequency.

SUMMARY OF THE INVENTION

The present method provides a possibility for testing the assignment through the base station of a frequency or of a frequency block to the participating terminal device.

In the case of the method according to the invention for testing the assignment through the base station of one or more transmission frequencies from a total number of theoretically-available transmission frequencies, a radio link is initially set up between the test device and a base station. With this radio link, data-signal portions are communicated through the test device with a given signal power and phase position on at least one assigned transmission frequency. The phase position and signal power to be set are adjusted as specified in the transmission standard. In the case of the OFDMA transmission method named here by way of example, each of these data-signal portions corresponds to a timeslot in the frame structure of the signal to be transmitted. In addition to the data-signal portions, test-signal portions are transmitted by the test device to the base station. One test-signal portion also corresponds to one timeslot. The test-signal portions are communicated to the base station on at least one transmission frequency not provided for data transmission and not assigned. In this context, every test-signal portion, which is transmitted by the test device is allocated with an individually-adjusted transmission power and a phase position for every transmission frequency used in the test-signal portion or respectively one frequency block provided there. This test-signal portion or several test-signal portions transmitted in succession by the test device are received by the base station. The signal powers and phase positions of the test-signal portions are evaluated individually for the transmission frequencies and/or frequency blocks of the test signal. Moreover, the signal power and/or the phase position are evaluated for the assigned transmission frequency. This can be implemented through an analysis of the data-signal portions or by transmission of the test-signal portions also on the assigned transmission frequency with subsequent evaluation only of the test-signal portion or of several test-signal portions. A transmission frequency or a frequency block to be used for the link between the base station and the participating terminal device and therefore to be assigned is determined on the basis of these evaluated signal powers and/or phase positions.

An assignment signal is generated and returned by the base station. This assignment signal contains the information regarding the transmission frequency to be used subsequently and is received by the test device. The assignment signal or its content is compared with an anticipated value corresponding to the individually-adjusted transmission powers and/or phase positions of the individual transmission frequencies or frequency block. The anticipated value is determined in the test device during the generation of the test-signal portions and indicates which transmission frequency should be determined in the case of a correct evaluation by the base station.

For the implementation of the method according to the invention, the test device provides a signal-generating unit, with which a signal is generated, which comprises at least one data-signal portion and at least one test-signal portion. In this context, the data-signal portion is transmitted on an assigned transmission frequency, and the test-signal portion is transmitted on at least one non-assigned transmission frequency in each case by a transmission device. The allocation of the data-signal portion to the assigned frequency and the assignment of the test-signal portion at least to at least one non-assigned transmission frequency is also implemented by the signal-generating unit. Furthermore, the test device provides a reception device for the reception of an assignment signal and a comparison device for comparing the content of the received assignment signal with an anticipated value. The transmission device is designed in such a manner that a signal power and/or a phase position can be individually assigned to the transmitted signals of each transmission frequency and/or to the frequency block with several transmission frequencies, and the transmission signal is output accordingly.

Furthermore, a reception device, an evaluation device, an assignment-signal generating unit and an evaluation device are provided in the base station. The evaluation device is connected to an operating-mode selection unit, wherein the evaluation device is designed in such a manner that, dependent upon a selection signal of the operating-mode selection unit, in each case, only those parameters determined from the signal received from the test device are used as the basis for determining the transmission frequency to be assigned or respectively the frequency block to be assigned.

In particular, a signal with a frame structure, which provides several successive time slots is advantageously generated for the transmission, wherein, respectively in successive frames of the signal, the same time slot is used for the transmission of the test-signal portion. The test-signal portion can be transmitted on several frequency blocks and/or transmission frequencies including the assigned transmission frequency, wherein several transmission frequencies are combined to form one frequency block in each case. In this context, the number of frequency blocks of the test-signal portion can, in particular, be varied in successive frames. On the one hand, it is then possible to cover the entire bandwidth through successive test-signal portions of successive frames; and, on the other hand, it is also possible to use, for example, only one frequency block in a targeted manner for testing the assignment function of the base station. In particular, the loading of the base station can also be adjusted accordingly, in that a different number of frequency blocks or non-assigned transmission frequencies are contained in different frames in the test-signal portion. Accordingly, an evaluation for the base station, in which the entire bandwidth is contained in the test-signal portion, is more comprehensive than if only one frequency block or even a single non-assigned transmission frequency is used.

Furthermore, it is advantageous to suppress in the base station further parameters influencing the assignment signal, so that the assignment signal is determined by the base station exclusively on the basis of the signal transmitted from the test device. Such further parameters are, for example, already-occupied transmission frequencies, on which a radio link is set up between the base station and other network participants. These transmission frequencies are not available in real operation. If the base station determines during regular operation, that such a frequency should be assigned, the assignment signal would still assign a different frequency. However, such an alternative assignment impairs the analysis result, because agreement with the anticipated value is not possible. Accordingly, the base station provides an operating-mode failure unit, through which the evaluation device is controllable. A selection signal of the operating-mode selection unit is supplied to the evaluation device, whereupon the evaluation device suppresses further parameters, which influence the assignment signal. Such further parameters can originate, for example, from the table, in which the transmission frequencies occupied by neighboring cells are stored.

According to a further preferred embodiment, it is determined by varying the signal powers and/or phase positions assigned to the frequency blocks or respectively transmission frequencies, from which minimum deviation from the signal power and/or the phase position of the assigned transmission frequency, a change of the assigned transmission frequency is implemented. The transmission of data between the base station and a participant, and therefore also with the test device, uses a transmission frequency once assigned until a change of the transmission frequency takes place through the assignment of a new transmission frequency. By keeping constant the signal powers or the phase position for the assigned transmission frequency and at the same time varying the signal power or respectively the phase position of the non-assigned transmission frequencies, it is possible to determine a criterion for the change. In this context, increasing the successive test portions stepwise for only one given transmission frequency or one given frequency block or changing the phase position stepwise, until the given transmission frequency or the given frequency block is assigned by the base station, is particularly preferred.

The test device provides at least one pattern for the selection of the transmission frequencies of the test-signal portion preferably stored in a buffer. Accordingly, the procedure of the test method can be controlled in a simple manner simply by calling up the predefined pattern. For example, the sequence of frequency blocks or transmission frequencies, which are used in successive test-signal portions, can also be stored in a predefined manner in the buffer, as can the variation of the signal powers and/or of the phase positions for the individual transmission frequencies or respectively frequency blocks of successive frames.

Moreover, the test device comprises a control unit, through which a signal power and/or a phase position is individually assigned to the test signal in each case for a transmission frequency or a frequency block. In this context, the control unit can be designed in particular so that, upon the variation of the signal power or the phase position, it recognizes the change of the assigned transmission frequency and then calls up a new pattern from the buffer of the test device or, for example, interrupts the test and outputs a result.

BRIEF DESCRIPTION OF THE DRAWINGS

A preferred embodiment of the invention is explained in greater detail in the description below on the basis of the drawings. The drawings are as follows.

DETAILED DESCRIPTION OF EXEMPLARY EMBODIMENTS OF THE INVENTION

Figure 1:
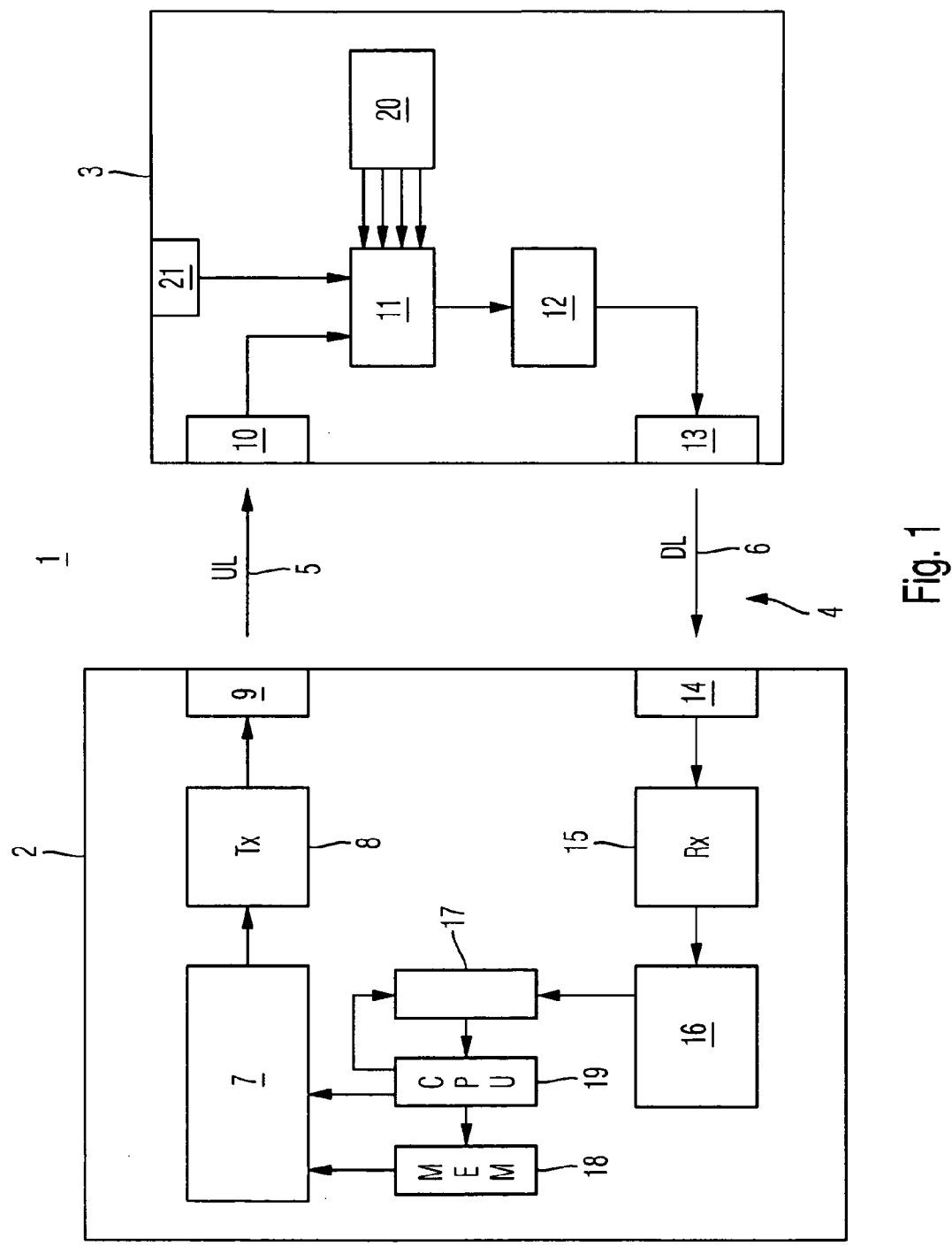
FIG. 1 shows a block-circuit diagram of the test system with a test device according to the invention and a base station according to the invention.

FIG. 1 shows patterntically a test system 1, which comprises a test device 2 and a base station 3. The base station 3 and the test device 2 are connected to one another via a radio link 4. The radio link comprises an up-link channel 5, over which the signals transmitted from the test device 2 are transferred to the base station 3. Conversely, a downlink channel 6 of the radio link 4 is provided, with which signals are transferred from the base station 3 to the test device 2.

The test device 2 comprises a signal-generating unit 7. The signal-generating unit 7 generates a signal to be transmitted, which will be explained in greater detail below with reference to FIGS. 2-4. This signal generated by the signal-generating unit 7 is output by means of a transmission device 8 and an interface 9. In this context, a transmission power and a phase position is allocated individually in each case to a transmission frequency of the signal. The transmission device 8 is designed in such a manner that it can generate individually a signal power and a phase position according to the specifications for every transmission frequency available in the generated signal. Accordingly, a signal is transferred via the interface 9 to the base station 3, which provides, for example, a power profile specified over the entire bandwidth.

The signal transmitted in this manner from the test device 2 is received at a reception interface 10 of the base station 3. The signal received there is supplied to an evaluation unit 11. For every transmission frequency or frequency block which can contain several transmission frequencies, contained in the signal, the evaluation unit 11 determines a signal power and a phase position. The qualitatively highest-value transmission frequency or respectively the frequency block with the best quality is therefore determined in the evaluation unit 11. An assignment signal, which is transmitted via the transmission interface 13 of the base station 3 and the downlink channel 6 back to the test device 2, is generated by the assignment-signal generating device 12 on the basis of this determined optimum transmission frequency or respectively frequency block. A second interface 14, which supplies the received assignment signal to a reception device 15 is formed in the test device 2. The assignment signal is evaluated in an evaluation device 16, and the content of the assignment signal is determined. On the basis of the determined content of the assignment signal, it is determined in a comparator 17, whether the transmission frequency actually assigned by the base station 3 agrees with the transmission frequency anticipated on the basis of the signal generated and transmitted by the test device 2. For this purpose, an anticipated value for the assignment, which stands for the transmission frequency to be assigned in the ideal case of a correct analysis by the base station 3, is determined by a control unit 19. On the basis of the signal powers and phase positions assigned to the individual transmission frequencies or respectively frequency blocks, the control unit determines which transmission frequency should be assigned by the base station 3 in the case of an ideal evaluation. This anticipated value is communicated by the control unit 19 to the comparator 17. The comparator 17 compares the anticipated value with the transmission frequency actually determined from the content of the assignment signal. The result of the comparison is once again supplied to the control unit 19. The control unit 19 may be connected, for example, to a screen for the output of the result in a manner not illustrated here.

Furthermore, the control unit 19 is connected to a buffer 18. Several different patterns, in which the selection of transmission frequencies or frequency blocks with several transmission frequencies are stored for the individual test-signal portions, can be stored in the buffer 18. Such a pattern can comprise, on the one hand, the pure selection of the transmission frequencies for every test-signal portion and, on the other hand at the same time, can contain an assignment of a given signal power to a transmission frequency. Additional patterns for the assignment of the signal power or the phase position to the transmission frequencies can also be stored in the buffer. These are then called up through the control unit 19 and routed to the signal-generating device 7, where the assignment between a transmission frequency and the respectively-provided signal power and/or phase position is implemented.

All deliberations relating to transmission frequencies also apply accordingly to frequency blocks, unless otherwise indicated.

The base station 3 also provides a source 20 for further parameters for the normal operating mode for setting up a radio link with several participants. These further parameters are taken into consideration by the evaluation device 11 in real operation, for example, in order to prevent double occupation of transmission frequencies. Such parameters are, for example, frequencies already occupied by other participants or links with other participants. Furthermore, the source 20 can contain a table, in which transmission frequencies used by neighboring cells, for example, within a cellular mobile-telephone network, are stored. These parameters are supplied to the evaluation device 11 in a normal operating mode. The evaluation unit 11 takes these parameters into consideration and accordingly determines, on the basis of the still-available transmission frequencies and the signal received from the test device 2, which of the freely-available transmission frequencies should be assigned to the test device 2. However, in order to implement an un-influenced measurement, the base station 3 also provides an operating-mode selection unit 21. Via the operating-mode selection unit 21, which is connected to the evaluation device 11, the evaluation device 11 is switched into a test mode, in which the parameters supplied by the source 20 are suppressed. A suppression of this kind can be implemented, for example, by skipping given steps in an algorithm of the evaluation unit 11. Alternatively, the corresponding inputs for reading in the parameters from the source 20 to the evaluation device 11 can also be occupied with default values.

A radio link 4 has been assumed above by way of explanation. However, for test purposes, a cable-bound connection can also be used instead of a radio link. Environmental influences, such as undesired attenuation, can be better controlled or excluded in this manner.

Figure 2:
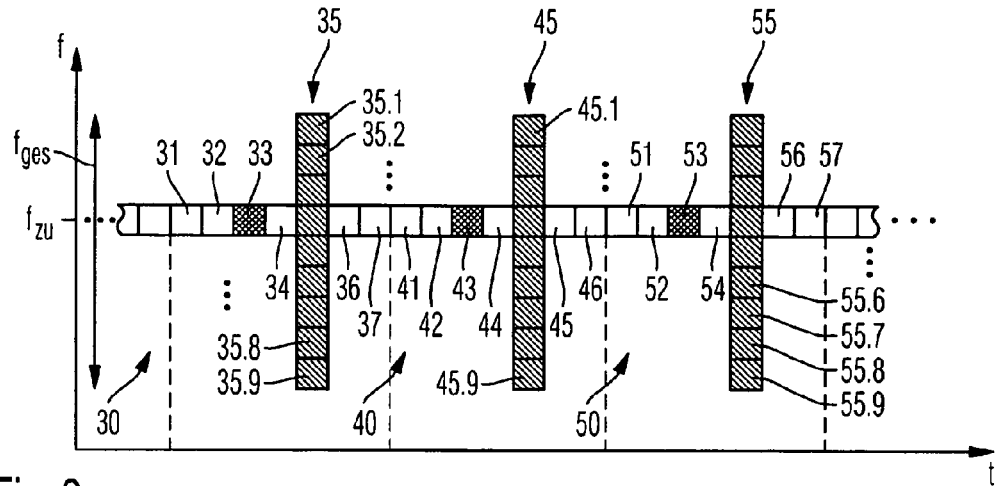
FIG. 2 shows a patterntic presentation of a signal transmitted from the test device by way of explanation of the procedure of the method according to the invention.

FIG. 2 illustrates a first example by way of explanation of a signal generated by the test device 2. A signal generated by the test device 2 provides successive frames 30, 40 and 50. In the exemplary embodiment presented, and without restricting the doctrine according to the invention, each of the successive frames 30, 40, 50 provides the seven timeslots 31-37, 41-47 and 51-57. Each of these timeslots corresponds to a signal portion. While the first four signal portions 31-34, 41-44 and 51-54 are each designed as data-signal portions, the fifth timeslot of each frame is provided as a test-signal portion 35, 45 and respectively 55.

The data-signal portions 31-34, 36, 37, 41-42, . . . are each transmitted on a frequency $f_{zu}$ assigned by the base station 3. By contrast, the test-signal portions 35, 45 and 55 are transmitted over the entire available bandwidth $f_{gesam}$. The entire bandwidth, with which the test-signal portions 35, 45 and 55 are transmitted, is subdivided respectively, for example, into nine frequency blocks 35.1-35.9, 45.1-45.9 and 55.1-55.9. Accordingly, each of the frequency blocks 35.i, 45.i and 55.i can, in turn, contain a plurality of transmission frequencies (sub-carrier frequencies).

During the transmission of the test-signal portion 35, a given signal power, with which the test-signal portion is transmitted on this frequency, is assigned to each of the frequency blocks 35.i. In order to allow an evaluation by the evaluation device 11 in the first place, these signal powers differ at least partially for the individual frequency blocks. The optimum frequency for a connection is determined by the base station 3 dependent upon these signal powers individually assigned to the frequency blocks 35.i and therefore to the transmission frequencies.

The assignment of different signal powers to the individual frequency blocks 35.i or respectively transmission frequencies, can be implemented, for example, by frequency-selective fading, which is generated in the transmission device 8.

The exemplary embodiment presented in FIG. 2 transmits over the entire bandwidth $f_{ges}$ in every one of the test-signal portions 35, 45 and 55 of the successive frames 30, 40, 50. Accordingly, the entire available frequency band has already been covered after each frame 30, 40, 50, and a frequency to be assigned can be determined by the base station 3 in the evaluation device 11 after each frame 30, 40 or 50.

Moreover, FIG. 2 shows that in each case the third timeslot of the frames 30, 40, 50 and accordingly of the data-signal portions 33, 43, 53 forms a so-called uplink-reference-signal for demodulation in the device connected to the base station 3. Using a pilot signal of this kind, data relevant for the link are communicated to the terminal device connected to the base station 3 in each case.

Figure 3:
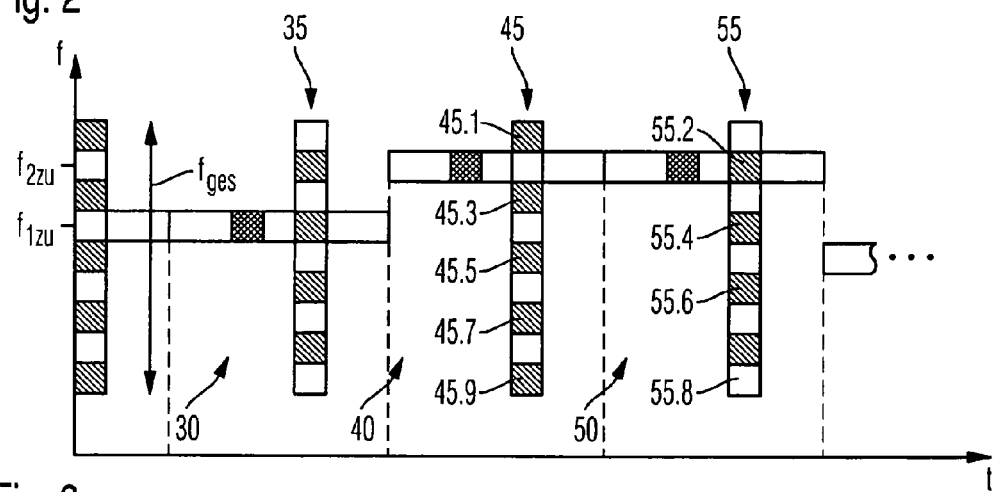
FIG. 3 shows a second patterntic presentation of a transmitted signal.

FIG. 3 shows a second exemplary embodiment of a signal for the implementation of the method according to the invention. With regard to clarity of presentation, only the respectively-relevant frequency blocks or data-signal portions have been provided with reference numbers. Initially, the data-signal portions of the first frame 30 or respectively of the frame preceding the first frame 30 are transmitted on a first assigned frequency $f_{1zu}$. After the reception of the test-signal portion 35, a new frequency $f_{2zu}$ is assigned by the base station 3. The data-signal portions 41*ff* are then communicated on this newly-assigned transmission frequency $f_{2zu}$. Independently of the above, the pattern for the selection of the frequency blocks determined by the control device 19 is retained for the test-signal portion to be transmitted in each case. It is evident that the test-signal portion 35 of the first frame 30 contains those frequency blocks, which were saved in the test-signal portion of the preceding frame. Accordingly, all frequency blocks of the entire frequency bandwidth $f_{ges}$ are therefore used by the test-signal portions in two successive frames. After one frequency block with an individually-allocated signal power and an individually-allocated phase position has been communicated to the base station 3 in this manner in each case for the entire available frequency band $f_{ges}$, an evaluation can be implemented by the base station 3 or respectively by its evaluation device 11. A change of a transmission frequency and accordingly the allocation of a new transmission frequency can therefore be implemented every two frames. This is illustrated again for frames 40 and 50. While the frequency blocks 45.1, 45.3, 45.5, 45.7 and 45.9 are transmitted in each case with an individually-allocated signal power and phase position in the second frame 40 in the test-signal portion 45, the other frequency blocks 45.2, 45.4, 45.6 and 45.8 still missing from the overall bandwidth are transmitted in the subsequent frame 50. Accordingly, the required information regarding the power and phase position is once again available to the base station 3 for the entire bandwidth after two frames 40 and 50.

Figure 4:
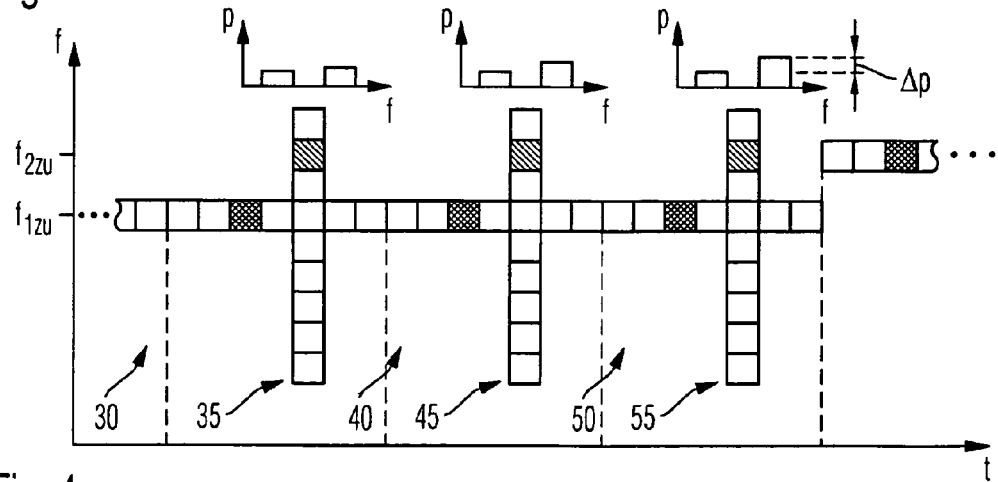
FIG. 4 shows a third patterntic presentation of transmitted signal.

FIG. 4 shows that not only can the correct assignment of a transmission frequency be determined dependent upon the signal powers or phase positions, but a threshold value or limit value, from which a change of the assigned transmission frequency is implemented, can also be determined.

For this purpose, as also shown in FIG. 4, the data transmission between the base station 3 and the test device 3 is implemented on a first assigned frequency $f_{1zu}$. The power for the transmission on the assigned transmission frequency is also held constant, as is the phase position. By contrast, a variation of the signal power or the phase position is implemented for at least one of the frequency blocks of the test-signal portions 35, 45 or 55. In the illustrated exemplary embodiment, in each case, the second frequency block 35.2, 45.2 and 55.2 is used to determine the minimal spacing distance of the signal power and/or of the phase position from the signal power or respectively phase position of the assigned transmission frequency. As illustrated above the respective test-signal portion 35, 45 and 55, the signal power is increased stepwise for the frequency $f_{2zu}$. Through the stepwise increase of the signal power, the signal power □P, at which the new frequency $f_{2zu}$ is assigned, can be determined by communicating a corresponding assignment signal through the base station 3.

FIG. 4 shows that only one frequency block 35.2, 45.2, 55.2 is used for this purpose in each test signal portion 35, 45 and 55. However, it is, of course, also possible to use more complex patterns for the implementation of the test with regard to the assignment of a transmission frequency. In particular, any required power profiles can be used for the individual transmission frequency or frequency blocks in each case within a test-signal portion, wherein some or all of the assigned signal powers can be varied within the successive frame.

Figure 5:
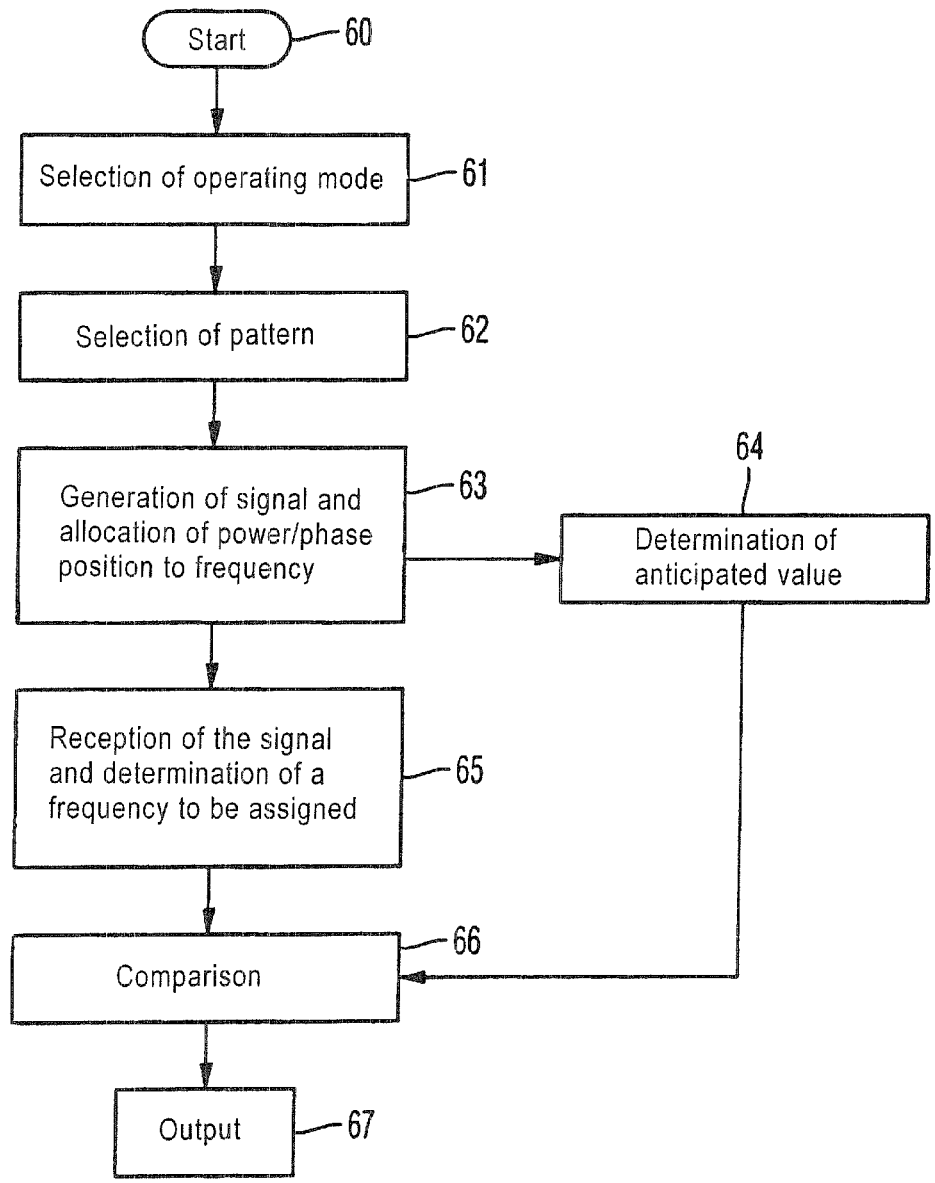
FIG. 5 shows a procedural process for the implementation of the method according to the invention for testing the assignment of a transmission frequency by the base station.

FIG. 5 once again illustrates the implementation of the method according to the invention in a simplified pattern. Initially, the test method is started in step 60. Before the transmission of data-signal portions and test-signal portions with signal power assigned individually to each transmission frequency or each frequency block, the operating mode of the base station is selected. Dependent upon the selection signal, the evaluation device is switched into the test mode, in which further parameters are suppressed (step 61). Following this, in step 62, the configuration, which the test-signal portions should provide, is selected. For this purpose, a pattern is read out by the signal-generating unit 7 from the buffer 18. This pattern can provide either only the frequency blocks used respectively in successive test-signal portions or alternatively can already contain the individually-assigned signal powers or phase positions for the successive test-signal portions. A pattern of this kind can be stored, for example, in the form of a table in the buffer 18.

After the selection of the pattern, a corresponding transmission signal, which consists of data-signal portions and test-signal portions, is generated in step 63. The signal comprises several successive frames, wherein a signal power and a phase position is allocated to the test-signal portions and also to the data-signal portions for each of the transmission frequencies used. From this information, that is to say, the frequencies used for the data-signal portions and the test-signal portions, and the allocated signal power and phase position, an anticipated value is determined in step 64. The anticipated value indicates which transmission frequency should subsequently be assigned to the test device by the base station 3. The anticipated value can also mean that a change of the momentarily-used transmission frequency should not be implemented.

The transmission signal is then transmitted by the test device 2 and received by the base station in step 35. There, a frequency to be assigned is determined in the evaluation device 11. If it was already previously specified by the operating-mode selection unit 21 that further parameters should be ignored, this frequency to be assigned is determined exclusively from the information, which is contained in the data-signal portions and test-signal portions transferred in the uplink channel 5. An assignment signal is generated by the base station 3 and returned in the downlink channel 6. The content of the assignment signal is compared in step 66 with the anticipated value, and the result of the evaluation is output in step 67. An evaluation of this kind can comprise, for example, the comparison of correct assignments and incorrect assignments by the base station 3.

The method according to the invention is not restricted to the exemplary embodiment presented. In particular, individual combinations of features are advantageously possible. Furthermore, reference is made to the fact that the patterns shown in FIGS. 2-4 are provided merely by way of illustration.

The invention claimed is:

1. Method for testing an assignment through a base station of one or more transmission frequencies with a test device, the method comprising the following procedural stages:

setting up a connection between the test device and the base station;

transmitting from the test device to the base station at least one data-signal portion on at least one assigned transmission frequency with a signal power and a phase position;

transmitting from the test device to the base station at least one test-signal portion on at least one non-assigned transmission frequency, wherein the respective test-signal portion for respectively one transmission frequency or one frequency block with several transmission frequencies is transmitted with an individually-adjusted transmission power and phase position for each transmission frequency or each frequency block, which differ from one another at least in part;

determining by the test device an anticipated value for an assignment signal from the transmission frequencies used for the at least one data signal portion and the at least one test-signal portion and the allocated signal powers and phase positions;

receiving by the base station the at least one data signal portion on the at least one assigned transmission frequency and the test-signal portion or the test-signal portions with the non-assigned transmission frequency and/or frequencies;

evaluating by the base station the signal powers and/or phase positions for the test-signal portions in an individual manner for the non-assigned transmission frequencies and/or frequency blocks and evaluation of the signal power and/or the phase position of the assigned transmission frequency;

determining by the base station based on the evaluation a transmission frequency or a frequency block to be assigned for communication between the test device and the base station and generating and returning of an assignment signal to the test device, the assignment signal having a content comprising information regarding the determined transmission frequency to the test device; and receiving the assignment signal and evaluating the content of the assignment signal by the test device and comparison of the evaluated content of the received assignment signal with the anticipated value for the content of the assignment signal.

2. Method according to claim 1,
wherein a signal with a frame structure is generated for the transmission, wherein a frame comprises several successive time slots, and in each case, the same time slot of mutually-successive frames is used on at least one non-assigned transmission frequency for the transmission of the test-signal portion.

3. Method according to claim 2,
wherein, in each case, several transmission frequencies are combined to form a frequency block, and the test-signal portion comprises several frequency blocks.

4. Method according to claim 2,
wherein further parameters influencing the assignment signal are suppressed through the base station and, accordingly, the assignment signal is determined only on the basis of the signal transmitted from the test device.

5. Method according to claim 2,
wherein, through variation of the signal powers and/or the phase positions individually allocated to the frequency blocks and/or to the transmission frequencies of the test-signal portion, a limit value for a deviation from the signal power and/or the phase position of the assigned transmission frequency is determined for the signal power and/or the phase position, in which a change of the assigned transmission frequency is brought about through the assignment signal.

6. Method according to claim 2,
wherein the at least one non-assigned transmission frequency and/or the at least one frequency block of successive test-signal portions provides a different frequency position by comparison with the preceding test-signal portion.

7. Method according to claim 6,
wherein the frequency position of the non-assigned transmission frequencies and/or frequency blocks is changed in successive test-signal portions according to a predetermined pattern.

8. Method according to claim 1,
wherein, in each case, several transmission frequencies are combined to form a frequency block, and the test-signal portion comprises several frequency blocks.

9. Method according to claim 1,
wherein further parameters influencing the assignment signal are suppressed through the base station and, accordingly, the assignment signal is determined only on the basis of the signal transmitted from the test device.

10. Method according to claim 1,
wherein, through variation of the signal powers and/or the phase positions individually allocated to the frequency blocks and/or to the transmission frequencies of the test-signal portion, a limit value for a deviation from the signal power and/or the phase position of the assigned transmission frequency is determined for the signal power and/or the phase position, in which a change of the assigned transmission frequency is brought about through the assignment signal.

11. Method according to claim 10,
wherein, in successive test-signal portions, for a given transmission frequency or a given frequency block, the signal power is increased stepwise until this given transmission frequency or this given frequency block is assigned by the base station.

12. Method according to claim 10,
wherein, in successive test-signal portions for a given transmission frequency or a given frequency block, the signal power is increased stepwise until this given transmission frequency or this given frequency block is assigned by the base station.

13. Method according to claim 1,
wherein the at least one non-assigned transmission frequency and/or the at least one frequency block of successive test-signal portions provides a different frequency position by comparison with the preceding test-signal portion.

14. Method according to claim 13,
wherein the frequency position of the non-assigned transmission frequencies and/or frequency blocks is changed in successive test-signal portions according to a predetermined pattern.

15. Test device for testing a base station, said test device comprising:

a signal-generating unit for generating a signal with at least one data-signal portion and at least one test-signal portion, wherein a transmission frequency assigned for connection with a base station is assigned to the at least one data-signal portion, and a non-assigned transmission frequency is assigned to the at least one test-signal portion;

a transmission device for the transmission of the signal with a signal power and/or phase position individually adjusted for each transmission frequency or respectively each frequency block to the base station;

a reception device for the reception of an assignment signal comprising information regarding a determined transmission frequency from the base station;

a control unit for determining an anticipated value for the assignment signal from the transmission frequencies used for the at least one data signal portion and the at least one test-signal portion and the allocated signal power and phase position; and a comparison device for comparing the content of the received assignment signal with the anticipated value for the content of the assignment signal.

16. Test device according to claim 15,
wherein at least one pattern for the selection of the transmission frequencies of the test-signal portion is stored in a buffer of the test device.

17. Test device according to claim 16,
wherein a control unit is provided, which is set up in such a manner that a signal power and/or a phase position is individually allocated to the test signal for the respective transmission frequency or the frequency block.

18. Test device according to claim 15,
wherein a control unit is provided, which is set up in such a manner that a signal power and/or a phase position is individually allocated to the test signal for the respective transmission frequency or the frequency block.

19. Base station comprising:

a reception device for receiving at least one data signal portion on at least one assigned transmission frequency and at least one test-signal portion with the non-assigned transmission frequency and/or frequencies;

an evaluation device for evaluating the signal power and/or phase positions for the test-signal portions in an individual manner for the non-assigned transmission frequencies and/or frequency blocks and evaluation of the signal power and/or the phase position of the assigned transmission frequency, and for determining at least one transmission frequency or a frequency block to be assigned for communication between a test device and the base station based on the evaluating;

an assignment-signal generating unit for generating an assignment signal, the assignment signal having a content comprising information regarding the at least one determined transmission frequency to the test device; and an operating-mode selection unit connected to the evaluation device, wherein, dependent upon a selection signal of the operating-mode selection unit, the evaluation device is adjustable in such a manner that only a received signal of the test device connected to the base station is evaluated.

* * * * *